United States Patent

Leenhouts et al.

[11] Patent Number: 5,877,831
[45] Date of Patent: Mar. 2, 1999

[54] MULTI-DOMAIN LCD WITH SUBPIXELS HAVING TWIST ANGLES WITH OPPOSITE TWIST SENSE OF WITHIN 60 AND SMALL/GREATER 90 DEGREES

[75] Inventors: Frans Leenhouts; Nicolaas A.J.M. Van Aerle, both of Eindhoven, Netherlands

[73] Assignee: Flat Panel Display Co. (FPD) B.V. Prof. Holstlaan 4, Eindhoven, Netherlands

[21] Appl. No.: 744,163

[22] Filed: Nov. 12, 1996

[30] Foreign Application Priority Data

Nov. 13, 1995 [EP] European Pat. Off. .............. 95203082

[51] Int. Cl.⁶ ................ G02F 1/1335; G02F 1/333; G02F 1/1343
[52] U.S. Cl. .................. 349/113; 349/42; 349/110; 349/144
[58] Field of Search .................. 349/129, 144, 349/42, 110

[56] References Cited

U.S. PATENT DOCUMENTS

| | | | |
|---|---|---|---|
| 3,947,185 | 3/1976 | Maezawa | 349/180 |
| 5,473,455 | 12/1995 | Koike et al. | 349/129 |
| 5,576,863 | 11/1996 | Aoki et al. | 349/129 |
| 5,610,739 | 3/1997 | Uno et al. | 349/144 |
| 5,646,702 | 7/1997 | Akinwande et al. | 349/144 |
| 5,657,105 | 8/1997 | McCartney | 349/144 |

OTHER PUBLICATIONS

Schadt et al, "Surface–Induced Parallel Alignment Of Liquid Crystals By Linearly Polymerized Photopolymers", Jpn. J. Appl. Phys. vol.31 (1992), pp. 2155–2164.

Koike et al, "A Full–Color TFT–LCD With A Domain–Divided Twisted–Nematic Structure", SID 92 Digest, pp. 798–801.

Primary Examiner—William L. Sikes
Assistant Examiner—Toan Ton
Attorney, Agent, or Firm—John C. Fox

[57] ABSTRACT

Nematic liquid crystal display device, in which the isocontrast curve has obtained a more symmetrical shape by combining two and four sub-pixels with twist angles which are smaller than 90 degrees, at which the sub-pixels are obtained by providing different orientation directions (11) in an orienting layer (8) by means of linearly polarized light. If a cholesteric nematic liquid crystal material is used, a sub-pixel may have a twist angle of more than 90 degrees, while pairs of sub-pixels then have twist angles of opposite twist sense, at which the sum of the absolute values of the twist angles is smaller than 180 degrees.

7 Claims, 4 Drawing Sheets

MULTI-DOMAIN LCD WITH SUBPIXELS HAVING TWIST ANGLES WITH OPPOSITE TWIST SENSE OF WITHIN 60 AND SMALL/ GREATER 90 DEGREES

BACKGROUND OF THE INVENTION

The invention relates to a liquid crystal display device having a plurality of pixels, comprising a layer of nematic liquid crystal material between a first substrate which is provided with a first orientation layer inducing a first orientation direction and a tilt angle in the molecules of the liquid crystal material, and a second substrate which is provided with a second orientation layer inducing two orientation directions in the molecules of the liquid crystal material, so that a pixel is divided into two sub-pixels.

Display devices of this type are generally used in, for example, monitors, TV applications and, for example, in display devices for motorcars and instruments.

A display device of the type mentioned in the opening paragraph is described in "A Full-Color TFT-LCD with a Domain-Divided Twisted-Nematic Structure", SID 92 DIGEST, pp. 798–801. In the domain-divided twisted-nematic LCD described in this article, pixels are divided into sub-pixels so as to reduce the viewing angle dependence, with the angle dependence being different for both sub-pixels, which is achieved by introducing different orientation or tilt angles on a surface for different parts of a pixel. In the device shown in this article, this is realized for a part of the cell by providing an orientation layer, yielding a high tilt angle after rubbing, on a layer yielding a low tilt angle after rubbing.

A drawback of this method is that two different layers of different materials must be provided, usually a first (in) organic layer yielding a low (pre)tilt and then a second organic layer yielding a high (pre)tilt. This requires an additional photolithographic step (providing the photoresist, masking, illuminating, developing and finally stripping of the photoresist). Moreover, when these layers are rubbed for obtaining the ultimate tilt angle at the interfaces, the layers with the high and low (pre)tilts will mix so that undefined edges of sub-pixels are created. If such a substrate (as used in active matrix displays) is provided with switching elements, they may get damaged due to electrostatic aspects during rubbing. Also with other multidomain techniques such as, for example the amorphous TN effect, the viewing angle dependence may be reduced. However, display devices based on this effect have a low contrast due to the formation of reverse-tilt disclination lines during operation of such display devices. It is true that the contrast can be enhanced to some extent by adapting the production process, but this results in a grainy image because the separate TN domains become visible.

OBJECTS AND SUMMARY OF THE INVENTION

It is an object of the invention to provide a display device of the type described in the opening paragraph, in which the sub-pixels can be obtained in a simple manner.

It is another object of the invention to provide a display device having a satisfactory viewing angle dependence.

It is a further object of the invention to provide a display device in which the grey scale inversion has decreased considerably.

It is yet another object of the invention to provide a display device in which there is no damage or hardly any damage of switching elements due to electrostatic discharge.

To this end, a display device according to the invention is characterized in that the second orientation layer comprises a linearly polarized photosensitive material at the area of the second substrate, and the sub-pixels have twist angles of opposite twist sense which are smaller than 90 degrees.

"Linearly polarized photosensitive material" is understood to mean that linearly polarized light for crosslinking the photosensitive material has been used. A suitable material is, for example a photopolymer such as poly(vinyl 4-methoxy-cinnamate).

The above-mentioned photolithographic step can be dispensed with when such linearly polarized photosensitive layers are used. The linearly polarized photopolymer (or another suitable material) orients the liquid crystal material substantially parallel (or at a small tilt angle) to the substrate in a direction perpendicular to the plane of polarization of the polarized light used for crosslinking the photosensitive material. This mode of orientation is known per se from M. Schadt et al.: "Surface-Induced Parallel Alignment of Liquid Crystals by Linearly Polymerized Photopolymers" (Jpn J. Appl. Phys. Vol. 31, p. 2155 (1992)).

The orienting layer thus formed now consists of a single material, which is not only advantageous in the manufacture but also for preventing the formation of undefined orientations at the interfaces (for example, due to damage during rubbing or accumulation of dust at an interface) and hence irregularities in the division of the cells.

By choosing the twist angle $\phi$ to be smaller than 90 degrees in each of the sub-pixels (for example, 80 degrees), the twist sense is defined unambiguously and "reverse twist" cannot occur when switching back to the normal state (zero voltage across the pixel). The isocontrast curves of the sub-pixels are rotated with respect to each other through the angle $\phi$ (at an equal twist angle $\phi$ of the sub-pixels), which notably yields a large viewing angle area, with no grey scale inversion.

When a cholesteric material is added to the nematic material, a twist angle of more than 90 degrees (up to approximately 110 degrees) can be chosen in one of the sub-pixels. The addition of the cholesteric material defines an unambiguous twist sense in the relevant sub-pixel, but should not have such a value that the two sub-pixels acquire the same twist sense.

A division into four sub-pixels is also possible, be it that a photolithographic step is necessary to provide a first orientation layer at the area of the first substrate, which orientation layer induces, at the location of a part of each pixel, a first orientation direction and a tilt angle in the molecules of the liquid crystal material and, at the location of the other part of each pixel, a second orientation direction antiparallel to the first orientation direction. Such a device is characterized in that the orientation layer comprises a linearly polarized photosensitive material at the area of the second substrate, and the sub-pixels associated with one orientation direction of the first orientation layer have twist angles of opposite twist sense which are smaller than 90 degrees.

If necessary, a cholesteric addition (chiral dope) may also be used in this case.

A preferred embodiment according to the invention is characterized in that the second substrate is provided with switching elements. Since the orienting layer formed by crosslinking is not rubbed, damage of the switching elements due to electrostatic charge caused by rubbing is now precluded.

These and other aspects of the invention will be apparent from and elucidated with reference to the embodiments described hereinafter.

BRIEF DESCRIPTION OF THE DRAWINGS

In the drawings:

FIG. 4 shows the resultant isocontrast curve, while

The Figures are diagrammatic and not to scale. Corresponding elements are generally denoted by the same reference numerals.

FIG. 1 is a diagrammatic cross-section of a part of a liquid crystal display device comprising a liquid crystal cell 1 with a twisted-nematic liquid crystal material 2 which is present between two supporting plates or substrates 3, 4 of, for example glass, provided with electrodes 5, 6. In this case, the liquid crystal material has a positive optical anisotropy and a positive dielectric anisotropy. If necessary, the device comprises polarizers (not shown) whose directions of polarization are, for example mutually crossed perpendicularly. The device further comprises orientation layers 7, 8 which orient the liquid crystal material on the inner walls of the substrates. The picture display device may be of the passive type but is preferably provided with active switching elements 15 (shown diagrammatically) which connect the electrodes 6 to drive electrodes.

Figure 1:
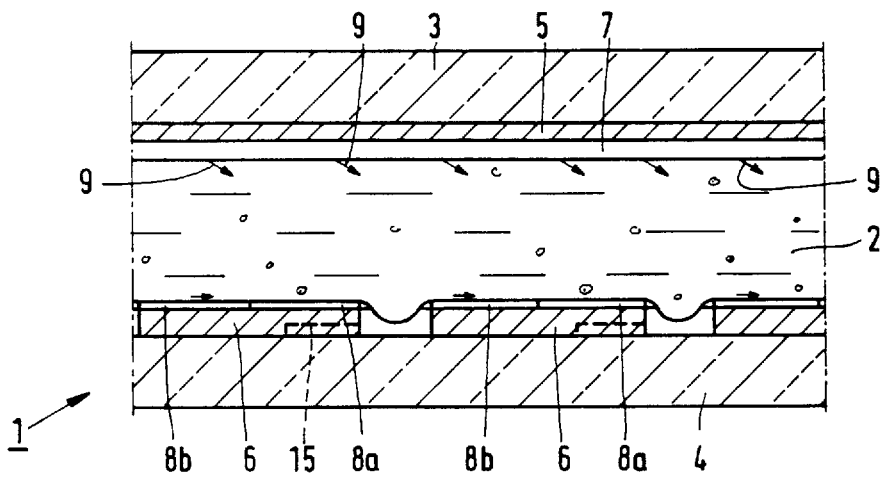
FIG. 1 is a diagrammatic cross-section of a part of a liquid crystal display device according to the invention.

The orientation layer 7 is obtained, for example, by providing a polyimide layer which has subsequently been subjected to a rubbing treatment. The molecules 9 of the liquid crystal material thereby acquire a preferred direction at the area of the layer 7, which direction is determined by the rubbing direction (denoted by the arrow 10 in FIG. 2) and a tilt angle which is, for example 3 degrees.

In this embodiment, the orientation layer 8 comprises poly(vinyl 4-methoxy-cinnamate). This material has the property that, after crosslinking due to irradiation with linearly polarized UV light, it orients the liquid crystal material perpendicularly to the plane of polarization of the linearly polarized UV light used. According to the invention, the orientation layer 8 was irradiated with linearly polarized UV light via a mask ($\lambda$=320 nm, at an energy of approximately 6 J/cm$^2$). In the non-masked parts 8b the molecules of the liquid crystal material in the ultimate display device were oriented, after said crosslinking, in such a way that they had the preferred direction 11b (denoted by means of a broken line in FIG. 2). The remaining part of the non-illuminated orientation layer 8 was subsequently also irradiated with linearly polarized UV light (in a different direction) via a mask. Consequently, after said crosslinking, the molecules of the liquid crystal material were oriented in the direction 11a (denoted by the broken line in FIG. 2) in the parts 8a of the completed cell. The orientation is such that (viewed from the substrate 3) the nematic liquid crystal material at the area of the parts 8a of the completed cell acquires a levorotatory twist angle $\phi_A$ of 80 degrees, and at the areas of the parts 8b, a dextrorotatory twist angle $\phi_B$ of 80 degrees. Although the two twist angles for the sub-pixels thus formed have the same value in this case, this is not absolutely necessary. In this case, the orientation of the layer 8 is thus effected without this layer coming in contact with masks, photoresist, etchants etc. After orienting the two substrates, they are combined in a conventional way after they have been mutually aligned, and are sealed and provided with a liquid crystal material. Crosslinking of the layer 8 by means of linearly polarized UV light may also be realized after filling the display device with liquid crystal material.

Since the twist angles $\phi_A$ and $\phi_B$ are smaller than 90 degrees, there is no reverse twist when the electric field across the pixels is switched off. Although the tilt angle at the area of the substrate 4 in both sub-pixels defined by the areas 8a and 8b is substantially zero, the fairly high tilt angle at the area of the substrate 3 ensures an average tilt angle of the same sign throughout the liquid crystal layer in the voltageless state, so that there is no reverse tilt when the electric field across the pixels is switched on.

The viewing angle dependence of a pixel is determined by that of the combination of the sub-pixels. In contrast to known two-domain techniques, in which sub-pixels are twisted with respect to each other through an optimum viewing direction of 180 degrees, sub-pixels having an optimal viewing direction twisted (in this example) by 80 degrees with respect to each other (maximally 90 degrees according to the invention), actually ($\phi_A+\phi_B$)/2) are used in the configuration according to the invention. As will be explained with reference to FIGS. 3 and 4, this yields a considerable improvement, notably as regards the grey scale inversion but also as regards the viewing angle dependence. For twist angles which are smaller than 60 degrees, the twist with respect to each other is, however, too small to yield a noticeable effect.

Figure 2:
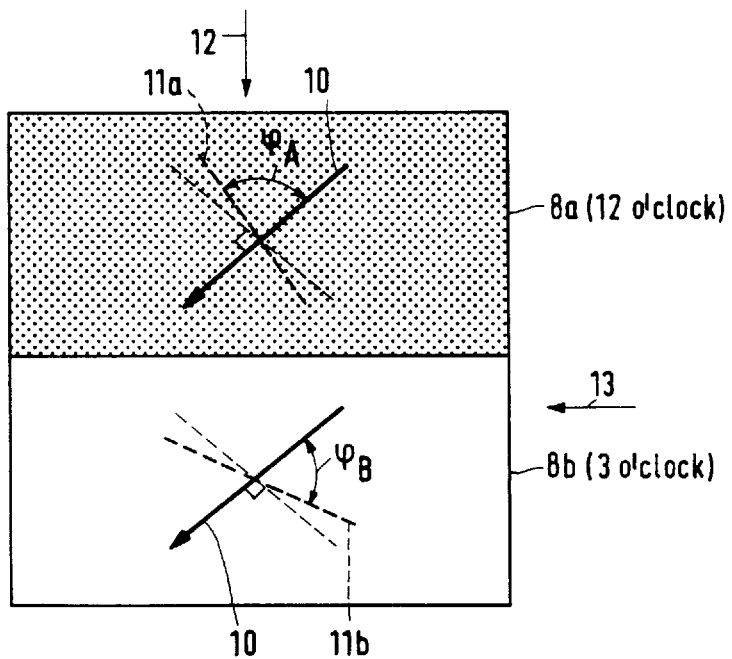
FIG. 2 shows diagrammatically the orientation directions on the two substrates for a device according to the invention.
Figure 2:
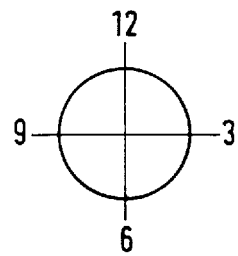
Figure 3A:
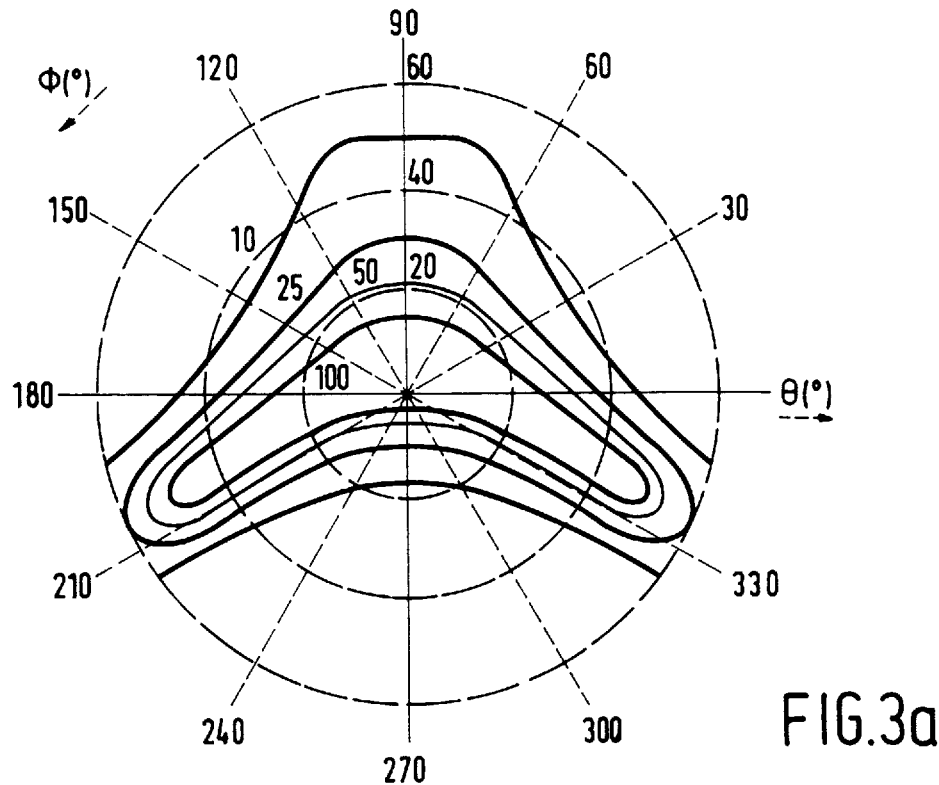
FIG. 3 shows the isocontrast curves for sub-pixels of such a device.

For a sub-pixel defined by an area 8a, it holds that it is optimized for viewing from the direction 12 in FIG. 2 (approximately the 12 o'clock direction). The associated isocontrast curve for the normally white mode (crossed polarizers) is shown in FIG. 3a. Here, $\Phi$ is the azimuth angle defined as the viewing direction angle with respect to the interface between the two sub-pixels in FIG. 2, and $\Theta$ is the polar angle between the viewing direction and the normal on the substrate. For a sub-pixel defined by an area 8b, it holds that it is optimized for viewing from the direction 13 in FIG. 2 (approximately 3 o'clock direction). The associated isocontrast curve is shown in FIG. 3b.

Figure 3B:
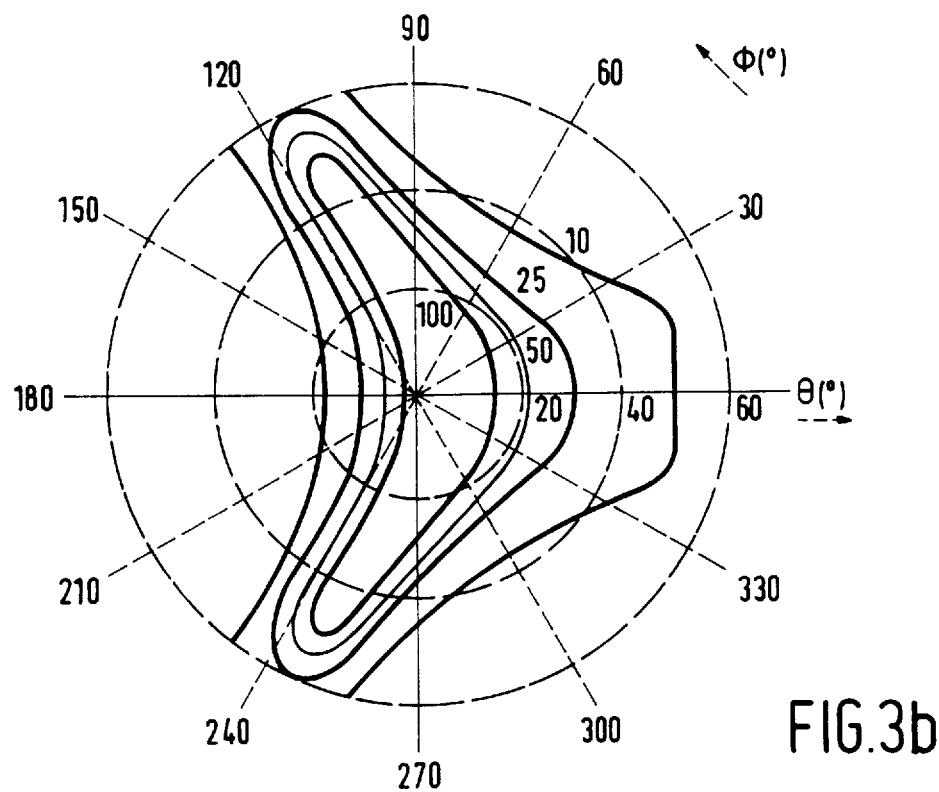
Figure 4:
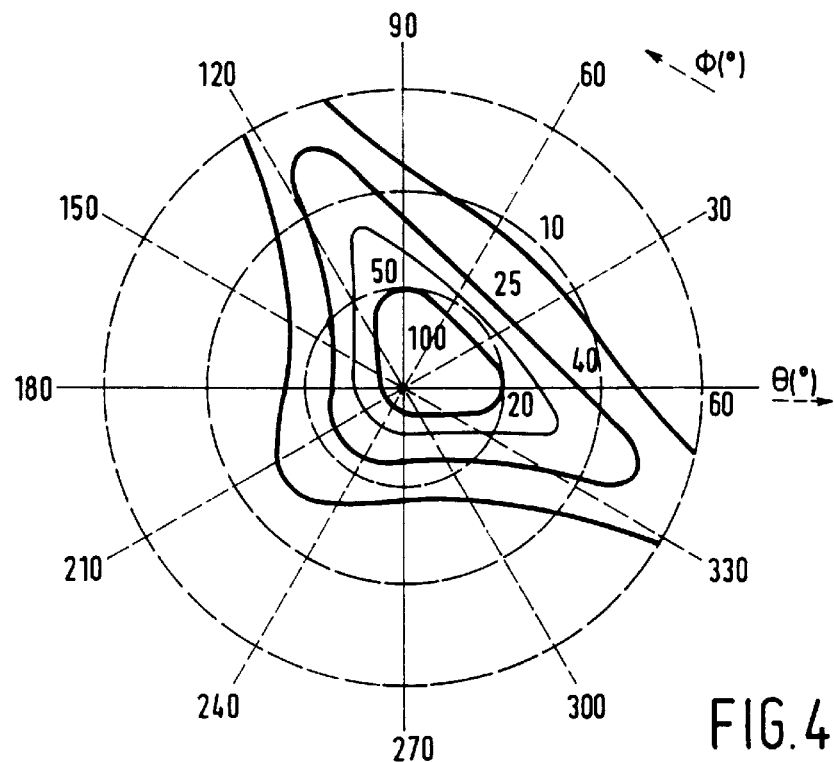

FIG. 4 shows the isocontrast curve for a cell composed of two sub-pixels with isocontrast curves of the sub-pixels according to FIGS. 3a and 3b. Although, viewed from all directions, a larger area within which the contrast ratio is larger than 10:1 is not found, the total curve has become much more symmetrical around the normal, which renders the device notably suitable for monitor and projection uses. Moreover, along the line $\Phi$=45/225 degrees, for example, the area with a contrast ratio of more than 10:1 is not larger than in the case of an undivided cell, but the area of $\Theta$ along the line $\Phi$=45 degrees (optimum viewing angle), in which there is no grey scale inversion, has increased considerably. At the optimum viewing angle in the curves according to FIG. 3a ($\Phi$=90 degrees) and FIG. 3b ($\Phi$=0 degrees) there is grey scale inversion already at $\Theta$=15 degrees, while it now occurs along the line $\Phi$=45 degrees at $\Theta$=40 degrees. The effective viewing angle is thus considerably larger.

To prevent the interface between the sub-pixels from being visible to the naked eye, the second substrate may be provided with an opaque material at the interface between two sub-pixels.

Although, in principle, no chiral dope (cholesteric addition) has to be added to the liquid crystal material, this may be done, if necessary. Such a dope may also provide the possibility of giving one of the two angles $\phi_A$, $\phi_B$ a value of more than 90 degrees (up to approximately 110 degrees), with the chiral dope ensuring that the twist sense is maintained. The other angle should then maintain an opposed twist sense, which means in practice that the sum of the absolute values of the twist angles is smaller than 180 degrees. The curve of FIG. 4 may be optimized with respect to a different viewing angle, also by modifying the orientation directions of the layer 7 and at the area of the layers 8. Moreover, instead of crossed polarizers, it is also possible to use parallel polarizers (normally black mode).

Figure 5:
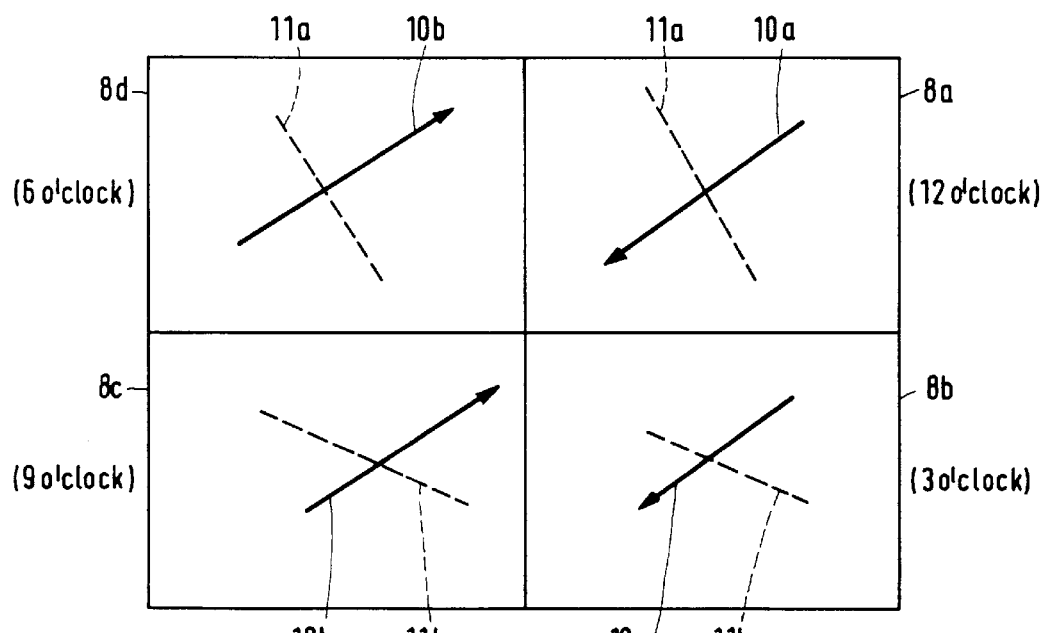
FIG. 5 shows diagrammatically the orientation directions on the two substrates for another device according to the invention.

FIG. 5 shows a device in which the orientation layer 7 has been subjected to a first rubbing treatment and subsequently to a masked second antiparallel rubbing treatment. The molecules 9 of the liquid crystal material thus acquire two preferred directions at the area of the layer 7, which directions are defined by the rubbing directions (denoted by the arrows 10a, 10b in FIG. 5) and a tilt angle which is, for example, 3 degrees. The orientation layer 8 is treated in the same way as described above with linearly polarized UV light with which again two preferred directions 11a, 11b in the molecules of the ultimate cell are obtained. In this way, a pixel is divided into four sub-pixels (8a, 8b, 8c, 8d) with four mutually substantially perpendicularly oriented optimum viewing angles (approximately 12 o'clock direction, approximately 3 o'clock direction, approximately 6 o'clock direction and approximately 9 o'clock direction).

Figure 6:
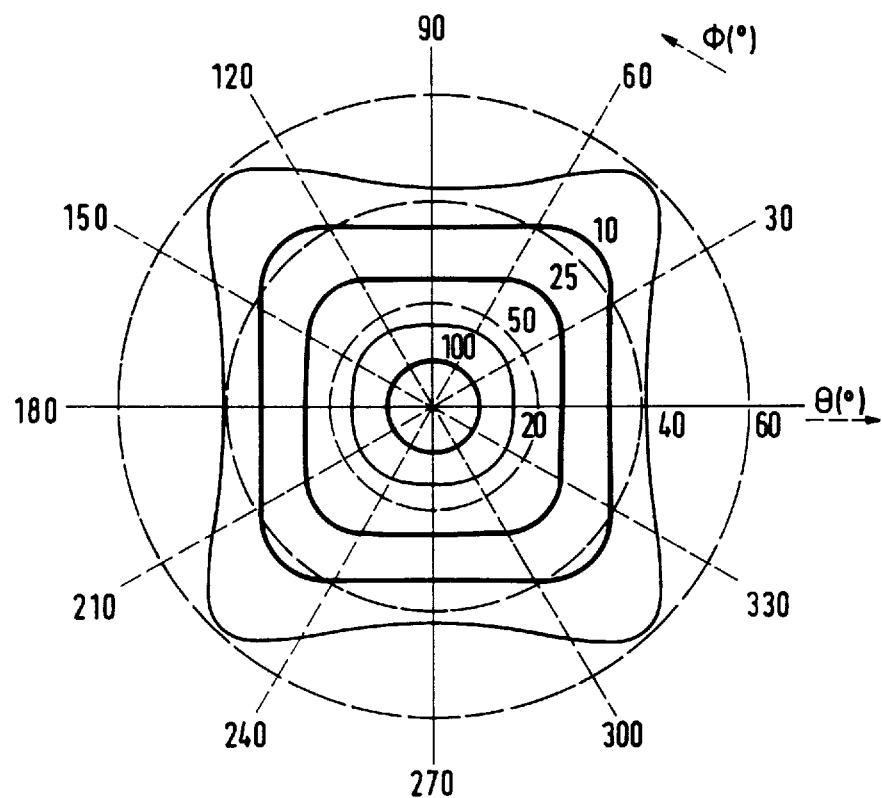
FIG. 6 shows the associated isocontrast curve.

The resultant isocontrast curve is now substantially entirely symmetrical (see FIG. 6). For obtaining the device with 4 sub-pixels, only one substrate is to be subjected to a lithographic treatment. In active matrix LCDs, this is preferably the substrate comprising no switching elements (referred to as the passive plate). Since a defined (pre)tilt (>0 degrees) is induced in this case, a high contrast is obtained.

Although the sub-pixels have a substantially identical size in the embodiments shown, this is not absolutely necessary.

The invention is also applicable to, for example LCD panels which are addressed in different ways, for example via optical or thermal addressing or via plasma discharges in parallel ducts on a first substrate.

In summary, the invention relates to a (chiral) nematic liquid crystal cell in which the isocontrast curve has obtained a more symmetrical shape by pairwise combination of sub-pixels having twist angles which are smaller than 90 degrees (or a sum of the absolute values smaller than 180 degrees), at which the sub-pixels are obtained by providing different orientation directions in one of the orienting layers of photosensitive material by means of linearly polarized light.

We claim:

1. A liquid crystal display device having a plurality of pixels, comprising a layer of nematic liquid crystal material between a first substrate which is provided with a first orientation layer inducing a first orientation direction and a tilt angle in the molecules of the liquid crystal material, and a second substrate which is provided with a second orientation layer inducing two orientation directions in the molecules of the liquid crystal material, so that a pixel is divided into two sub-pixels, characterized in that the second orientation layer comprises a linearly polarized photosensitive material at the area of the second substrate, and the sub-pixels have twist angles of opposite twist sense which are within the range of 60 to less than 90 degrees.

2. A liquid crystal display device as claimed in claims 1, characterized in that the second substrate is provided with switching elements.

3. A liquid crystal display device as claimed in claims 1, characterized in that the second substrate is provided with an opaque material at the area of the interface between sub-pixels.

4. A liquid crystal display device having a plurality of pixels, comprising a layer of nematic liquid crystal material with a cholesteric addition between a first substrate which is provided with a first orientation layer inducing a first orientation direction and a tilt angle in the molecules of the liquid crystal material, and a second substrate which is provided with a second orientation layer inducing two orientation directions in the molecules of the liquid crystal material, so that a pixel is divided into two sub-pixels, characterized in that the second orientation layer comprises a linearly polarized photosensitive material at the area of the second substrate, and the sub-pixels have twist angles of opposite twist sense, at which the sum of the absolute values of the twist angles is within the range of 120 to less than 180 degrees.

5. A liquid crystal display device as claimed in claim 4, characterized in that the second substrate is provided with switching elements.

6. A liquid crystal display device having a plurality of pixels each being divided into at least two sub-pixels, comprising a layer of nematic liquid crystal material between a first substrate which is provided with a first orientation layer inducing a first orientation direction at the location of a part of each pixel, and a tilt angle in the molecules of the liquid crystal material, and inducing a second orientation direction, antiparallel to the first orientation direction, at the location of the other part of each pixel, and a tilt angle in the molecules of the liquid crystal material, and a second substrate which is provided with a second orientation layer inducing two orientation directions in the molecules of the liquid crystal material, so that a pixel is divided into four sub-pixels, characterized in that the second orientation layer comprises a linearly polarized photosensitive material at the area of the second substrate, and the sub-pixels associated with one orientation direction of the first orientation layer have twist angles of opposite twist sense which are within the range of 60 to less than 90 degrees.

7. A liquid crystal display device having a plurality of pixels each being divided into at least two sub-pixels, comprising a layer of nematic liquid crystal material with a cholesteric addition between a first substrate which is provided with a first orientation layer inducing a first orientation direction at the location of a part of each pixel, and a tilt angle in the molecules of the liquid crystal material, and inducing a second orientation direction, antiparallel to the first orientation direction, at the location of the other part of each pixel, and a tilt angle in the molecules of the liquid crystal material, and a second substrate which is provided with a second orientation layer inducing two orientation directions in the molecules of the liquid crystal material, so that a pixel is divided into four sub-pixels, characterized in that the second orientation layer comprises a linearly polarized photosensitive material at the area of the second substrate, and the sub-pixels associated with one orientation direction of the first orientation layer have twist angles of opposite twist sense, at which the sum of the absolute values of the twist angles is within the range of 120 to less than 180 degrees.

* * * * *